(12) United States Patent
Kondou et al.

(10) Patent No.: US 6,377,017 B2
(45) Date of Patent: Apr. 23, 2002

(54) CONTROL DEVICE FOR ALTERNATING CURRENT MOTOR

(75) Inventors: Hajime Kondou; Yuuji Saito; Hideyuki Jinzai; Kazuaki Takizawa; Hiroaki Shinoki; Tomoyuki Itoh, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/739,971

(22) Filed: Dec. 20, 2000

(30) Foreign Application Priority Data

Dec. 24, 1999 (JP) ............................................ 11-368442

(51) Int. Cl.$^7$ ................................................. H02P 1/24
(52) U.S. Cl. ....................... 318/727; 318/802; 318/801; 318/811; 318/813
(58) Field of Search ................................. 318/802, 801, 318/811, 813, 727, 827, 798, 780

(56) References Cited

U.S. PATENT DOCUMENTS 6,069,467 A * 5/2000 Jansen ......................... 318/802
6,147,470 A * 11/2000 Ohashi et al. ............... 318/757
6,184,648 B1 * 2/2001 Kato et al. ................... 318/811

* cited by examiner

*Primary Examiner*—Karen Masih
(74) *Attorney, Agent, or Firm*—Arent Fox Kintner Plotkin & Kahn, PLLC

(57) ABSTRACT

A control device for an alternating current motor includes: a target current generating unit which generates a current order value, based on a torque order, as a d-axis target current and a q-axis target current on dq coordinates; a current detection device which detects an alternating current supplied to each phase of a polyphase alternating current motor; a coordinate transforming unit which transforms the alternating current detected by the current detection device into a d-axis current and a q-axis current on the dq coordinates; and a vector control unit which carries out a current feedback control so that the d-axis current follows up the d-axis target current and the q-axis current follows up the q-axis target current. The vector control unit further includes: an operation switching unit which, depending on whether a back electromotive voltage of the alternating current motor is greater than or equal to a predetermined value, calculates one of a d-axis deviation and a q-axis deviation from the deviation between the d-axis target current and the d-axis current and the other one of the d-axis deviation and the q-axis deviation from the deviation between the q-axis target current and the q-axis current; and an integration controlling unit which outputs a d-axis integration voltage order value proportional to an integral value of the d-axis deviation and a q-axis integration voltage order value proportional to an integral value of the q-axis deviation. An alternating current supplied to each phase of the alternating current motor is controlled based on an output of the integration controlling unit.

2 Claims, 3 Drawing Sheets

CONTROL DEVICE FOR ALTERNATING CURRENT MOTOR

BACKGROUND OF THE INVENTION

1. Field of the Invention

The present invention relates to a control device for an alternating current motor. More specifically, the present invention relates to a technique used in an electric current feedback control system for carrying out a follow-up control of a measured value of the electric current with respect to an ordered value of the electric current.

2. Description of Related Art

In an alternating current (AC) motor, such as a permanent magnet type motor which utilizes a permanent magnet in the field, a control device for an AC motor is generally known which measures the electric current of an armature of the AC motor, converts the measured value into rectangular coordinates which rotate in synchronization with a rotor, i.e., the dq coordinate system, and carries out a feedback control so that the deviation between the ordered value and the measured value of the current on the dq coordinate becomes zero.

In such an AC motor, a change in the magnetic flux density is generated in the field magnetic flux which penetrates through a coil of the armature when, for instance, a rotor having a permanent magnet rotates, and a back electromotive voltage Er, which acts to cancel the supplied voltage of the coil electric current, is generated. The back electromotive voltage Er increases as the number of rotations of the rotor increases and, when Er becomes equal to the supplied voltage of the coil electric current, the coil electric current becomes zero and the rotation torque of the rotor also becomes zero.

A so-called weak field control is known, which makes it possible to increase, for instance, the operable range of the number of rotation, the rotation torque which may be generated, the number of rotations at which the motor can operate with high efficiency, and the range of rotation torque, by weakening the magnetic flux of the field equivalently.

FIG. 4 is a vector diagram showing a stationary state of an example of a conventional control device for an AC motor when a vector control is performed. In the figure, the direction of the magnetic flux of the field is indicated by the d-axis and the direction which is perpendicular to the d-axis is indicated by the q-axis. Ld and Lq indicate the inductance of the d-axis and the q-axis, respectively; R indicates an each phase resistance of the alternating current motor; ωre indicates a velocity of the electrical angle of the AC motor; φ indicates a main magnetic flux of the field of the AC motor; id and iq indicate the electric current along the d-axis and the q-axis, respectively; vd and vq indicate the voltage along the d-axis and the q-axis, respectively, and Vmax indicates a maximum voltage which may be supplied to each phase of the AC motor.

In this case, the voltage, vd, in the d-axis and the voltage, vq, in the q-axis may be expressed by the equations (1) shown below. In the equation, ωrexLdxid, which is a q-axis interference term, becomes a weak field component when the back electromotive voltage Er exceeds the maximum voltage Vmax, which may be supplied to each phase of the AC motor, and a weak field control is performed. Accordingly, the vector of the q-axis interference term extends downwardly in FIG. 4 when the electric current id in the d-axis is increased and, hence, the AC motor may be actuated by using a voltage smaller than the back electromotive voltage Er=(ωre×φ) at the voltage vq in the q-axis. In this manner, a desired rotational torque may be output by increasing the number of operational rotations.

$$Vd = R \times id - \omega re \times Lq \times iq$$

(where ωrexLqxiq indicates d-axis interference term)

$$Vq = R \times iq + \omega re \times \phi + \omega re \times Ld \times id \qquad (1)$$

(where ωrexLdxid indicates q-axis interference term)

In the above-mentioned example of the conventional control device for the AC motor, after the back electromotive voltage, Er, of the AC motor exceeds the maximum voltage, Vmax, which may be supplied to each phase of the AC motor, and the rotation number is further increased, the actuation of the AC motor becomes impossible if ωrexLdxid, which is the q-axis interference term and becomes a weak field component, is not increased in accordance with an increase in the back electromotive voltage Er=(ωre×φ).

In the state described above, the magnitude of the voltage vq at the q-axis tends to be dominated by the magnitude of the electric current id at the d-axis. Further, because the d-axis interference term: −ωrexLqxiq is present at the d-axis, the voltage vd on the d-axis tends to be dominated by the magnitude of the electric current iq on the q-axis.

In the above control device for an AC motor, however, the control of the electric current feedback is separately carried out for the d-axis and the q-axis. Hence, at the d-axis, the control is executed so that the deviation between the ordered value for the d-axis and the measured value of the electric current becomes zero and, at the q-axis, it is controlled so that the deviation between the ordered value for the q-axis and the measured value of the electric current becomes zero. For this reason, in a state in which one of the voltages vd and vq becomes dominant to the other voltage, there is a danger that the current control for stabilizing the AC motor may be destroyed. Thus, the current control may be destabilized and the electric current may be varied rapidly or a desired torque may not be obtained.

On the other hand, in the region where the back electromotive voltage Er of an AC motor is smaller than the maximum voltage, Vmax, which may be supplied to each phase of the AC motor, a so-called non-interactive control is known by which a d-axis compensation term and a q-axis compensation term that counteract each interference component for the d-axis and q-axis, respectively, are input so that an independent control of the d-axis and the q-axis becomes possible by counteracting the speed electromotive force components which interfere with each other between the d-axis and the q-axis.

However, in the region where the back electromotive voltage Er exceeds the maximum voltage Vmax, which may be supplied to each phase of the AC motor, the non-interactive control cannot be carried out since a power source, for instance, a battery or fuel cell, which supplies a voltage to the coil current, cannot provide the extra voltage. Thus, problems such as an instability in the control of the AC motor may be generated.

SUMMARY OF THE INVENTION

Accordingly, one of the objectives of the present invention is to provide a control device for an AC motor which can perform a stable control of the motor even when the back electromotive force of the AC motor is increased.

The above objectives may be achieved by a control device for an alternating current motor according to the present invention (for example, a control device 10 for an alternating motor explained in the embodiment described later), including: a target current generating unit (for instance, a target current computing unit 22 in the embodiment described later) which generates a current order value, based on a torque order (for example, a torque order, *T, in the embodiment described later), as a d-axis target current (for example, a d-axis target current, *id, in the embodiment described later) and a q-axis target current (for example, a q-axis target current, *iq, in the embodiment described later) on dq coordinates which are of a rotating rectangular coordinate system; a current detection device (for example, electric current detectors 16 and 17 in the embodiment described later) which detects an alternating current supplied to each phase (for example, a U-phase, V-phase, and W-phase in the embodiment described later) of a polyphase alternating current motor (for example, an AC motor 11 in the embodiment described later); a coordinate transforming unit (for example, a three-phase ac-dq coordinate transformer 31 in the embodiment described later) which transforms the alternating current detected by the current detection device into a d-axis current (for example, a d-axis current, id, in the embodiment described later) and a q-axis current (for example, a q-axis current, iq, in the embodiment described later) on the dq coordinates; and a vector control unit (for example, a vector controlling unit 23 in the embodiment described later) which carries out a current feedback control so that the d-axis current follows up the d-axis target current and the q-axis current follows up the q-axis target current, wherein the vector control unit further includes: an operation switching unit (for example, an integration operation switching unit 37 in the embodiment described later) which, depending on whether a back electromotive voltage (for example, a back electromotive voltage, Er, in the embodiment described later) of the alternating current motor is greater than or equal to a predetermined value, calculates one of a d-axis deviation (for example, a d-axis deviation, $\Delta$id, in the embodiment described later) and a q-axis deviation (for example, a q-axis deviation, $\Delta$iq, in the embodiment described later) from the deviation between the d-axis target current and the d-axis current (for example, a deviation, $\Delta$idorg, in the embodiment described later) and the other one of the d-axis deviation and the q-axis deviation from the deviation between the q-axis target current and the q-axis current (for example, a deviation, $\Delta$iqorg, in the embodiment described later); and an integration controlling unit (for example, integration control units 38 and 39 in the embodiment described later) which outputs a d-axis integration voltage order value (for example, a d-axis integration voltage order value, Vdi, in the embodiment described later) proportional to an integral value of the d-axis deviation and a q-axis integration voltage order value (for example, a q-axis integration voltage order value, Vqi, in the embodiment described later) proportional to an integral value of the q-axis deviation, wherein an alternating current supplied to each phase of the alternating current motor is controlled based on an output of the integration controlling unit.

According to the control device for an AC motor having the above-mentioned structure, it becomes possible, under a weak field control, to control the electric current of the AC motor in a stable manner even when the back electromotive voltage of the AC motor exceeds the maximum voltage, which may be supplied to each phase of the AC motor, and the d-axis voltage is dominated mainly by the q-axis current, iq, and the q-axis voltage is mainly dominated by the d-axis current, by carrying out an integration operation of an ordered voltage based on the current deviation of the opposite axis. Thus, according to the present invention, a desired torque may be assuredly generated.

The present invention also provides a control device for an alternating current motor, further including: a power conversion unit (for example, an inverter 13 in the embodiment described later) which drives the alternating current motor, the power conversion unit being controlled by the vector control unit; and a power supply unit (for example, a power supply 14 in the embodiment described later) which supplies a direct current to the power conversion unit, wherein the predetermined value is equal to the maximum voltage which may be supplied to the alternating current motor from the power conversion unit (for example, the maximum voltage, Vmax, which may be supplied to the AC motor 11 from the inverter 13 in the embodiment described later) and adjustable depending on the magnitude of a voltage (for example, a power supply voltage, Vdc, in the embodiment described later) supplied by the power supply unit.

According to the control device for an AC motor having the above-mentioned structure, for instance, when the voltage of the power supply unit is changed, it is possible to assuredly obtain the timing at which an integration operation of an ordered voltage based on the current deviation of the opposite axis is carried out. Accordingly, for example, when the number of rotations of the AC motor is low, the integration operation of the ordered voltage can be carried out in a secured manner based on the current deviation of the opposite axis in synchronization with the start timing of the weak field control. Thus, the AC motor can be smoothly controlled.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE INVENTION

Hereinafter, embodiments of the control device for an AC motor according to the present invention will be described with reference to attached drawings.

Figure 1:
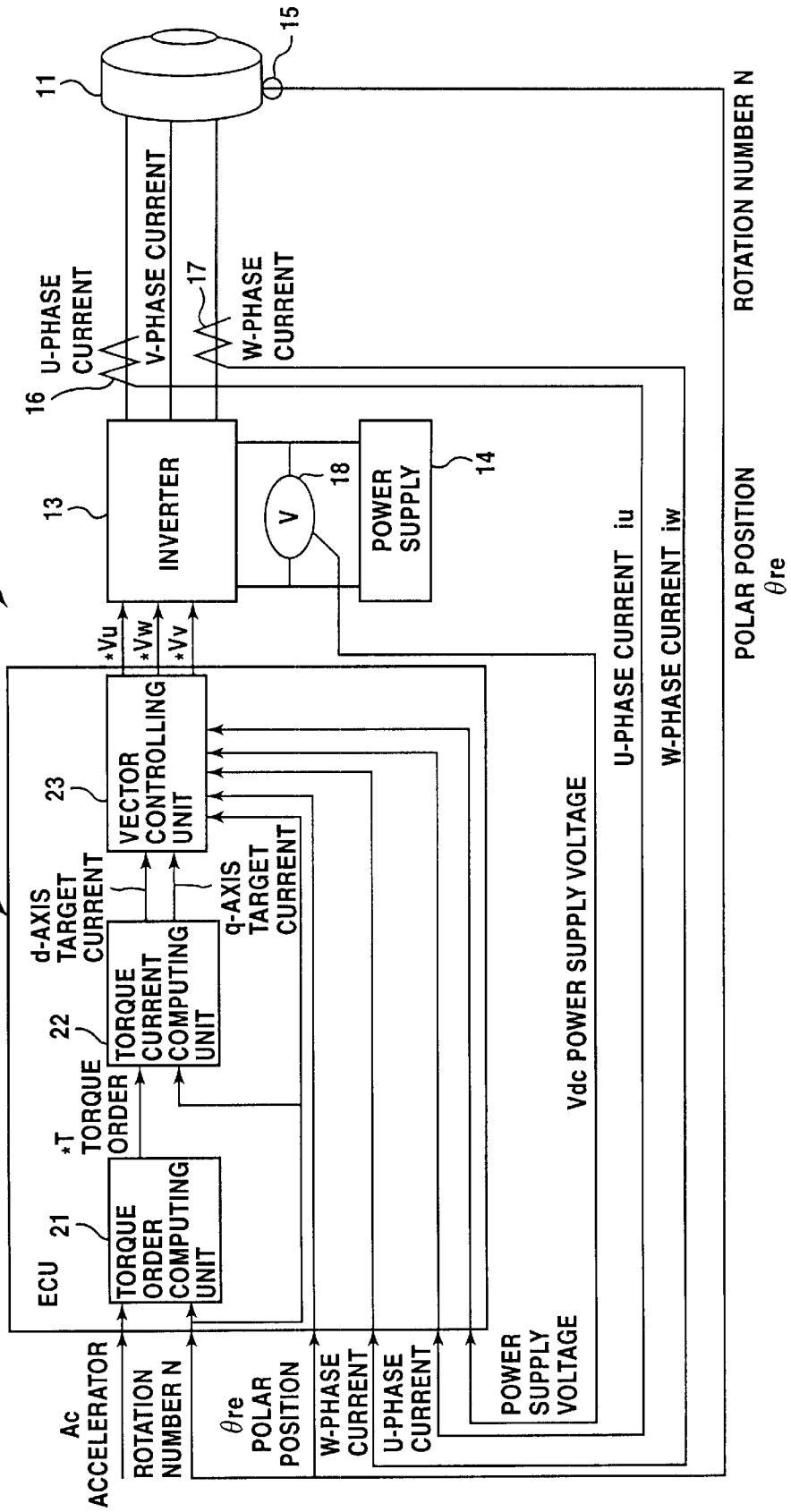
FIG. 1 is a structural diagram of a control device for an AC motor according to an embodiment of the present invention.
Figure 2:
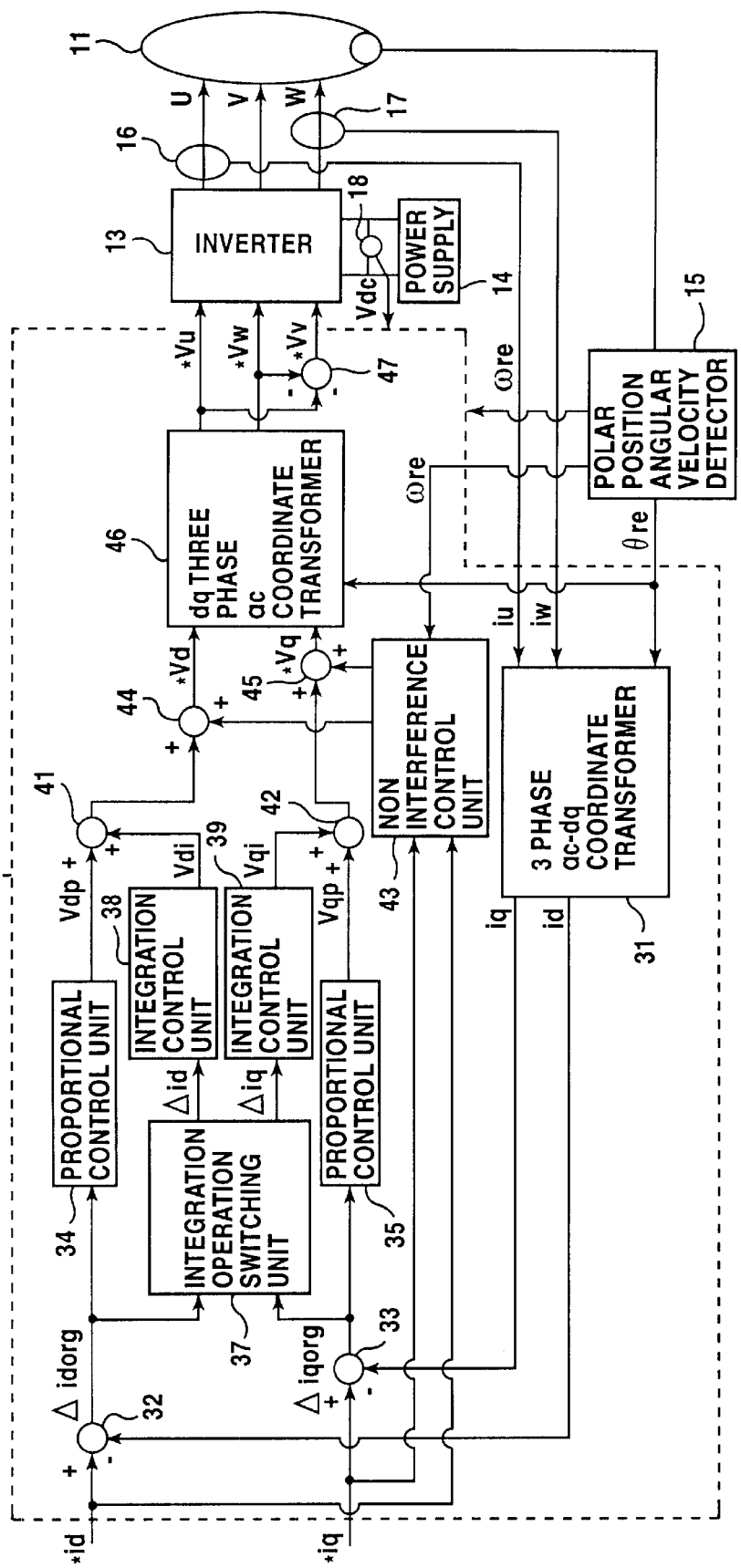
FIG. 2 is a structural diagram of a vector control unit shown in FIG. 1.

FIG. 1 is a structural diagram showing a control device 10 according to an embodiment of the present invention. FIG. 2 is a structural diagram of a vector control unit 23 shown in FIG. 1.

The AC motor control device 10 according to an embodiment of the present invention is capable of controlling an AC motor 11, which may be used in, for instance, an electric vehicle. The AC motor 11 may be, for example, an alternating current synchronous (ACS) motor of a permanent magnet type which utilizes a permanent magnet in its field.

As shown in FIG. 1, the control device 10 for an AC motor includes an electrical control unit (ECU) 12, an inverter 13, and a power supply 14.

The inverter 13 may be, for instance, a pulse width modulation (PWM) inverter and includes a switching element such as an insulated gate bipolar transistor (IGBT). The inverter 13 converts a dc power supplied by the power supply 14, which may be, for instance, a battery or a fuel cell, into three-phase ac power and supplies it to the AC motor 11.

The ECU 12 controls a power converting operation of the inverter 13 and outputs a U-phase ac voltage order value, *Vu, a V-phase ac voltage order value, *Vv, and a W-phase ac voltage order value, *Vw, to the inverter 13 as switching orders so that a U-phase current, iu; a V-phase current, iv; and a W-phase current, iw, corresponding to each of the ordered voltage values, *Vu, *Vv, and *Vw, respectively, may be output to each phase of the AC motor 11 from the inverter 13.

For this reason, the following signals are input into the ECU 12 including a signal of a magnitude of accelerator operation, Ac, relating to such operation as an actuating operation of an accelerator pedal by a driver, a signal of a polar position θre (electrical angle) and a rotation number N of the AC motor 11 which are output from a polar position-angular velocity detector provided with the AC motor 11, a signal of, for instance, the U-phase current, iu, and the W-phase current, iw, output from electric current detectors 16 and 17 for detecting an ac current supplied to the U-phase and the W-phase between the inverter 13 and the AC motor 11, and a signal of a power supply voltage, Vdc, output from a voltage detector 18 provided with the power supply 14.

Also, the ECU 12 includes a torque order computing unit 21, a target current computing unit 22, and a vector controlling unit 23.

The torque order computing unit 21 calculates a torque value required based on the magnitude of accelerator operation, Ac, and the rotation number, N, and generates a torque order, *T, necessary for generating the torque value in the AC motor 11, which is output to the target current computing unit 22.

The target current computing unit 22 calculates a current order for assigning the current for each phase, iu, iv, and iw, which is supplied to the AC motor 11 from the inverter 13, based on the torque order value, *T, and the rotation number N. The current order is output to the vector controlling unit 23 as a d-axis target current, *id, and a q-axis target current, *iq, on the rotating orthogonal coordinates.

In the dq coordinates forming the rotating orthogonal coordinates, the direction of the magnetic flux of the field is indicated by, for instance, the d-axis and the direction perpendicular to the d-axis is defined as the q-axis. The dq coordinates rotates in synchronization with the rotor (not shown in the figure) of the AC motor 11 at an electrical angular velocity of ωre. In this manner, the d-axis target current, *id, and the q-axis target current, *iq, which are direct current type signals, are supplied as a current order with respect to an ac signal supplied to each phase of the AC motor 11 from the inverter 13.

Also, the target current computing unit 22 increases the d-axis target current, *id, in accordance with the back electromotive voltage, Er, when the back electromotive voltage, Er, is increased in proportion to the rotation number N of the AC motor 11 and exceeds the maximum voltage, Vmax, which is the limit of voltage may be supplied to the AC motor 11 from the inverter 13, so that the weak field control due to the d-axis armature reaction may be carried out by an equivalently weakened magnetic flux of the field.

The vector controlling unit 23 carries out a feedback control of the electric current on the dq coordinates and calculates each voltage order value *Vu, *Vv, and *Vw to be output to the inverter 13 based on the d-axis target current *id and the q-axis target current *iq. In the feedback control process, the vector controlling unit 23 controls so that the deviation between each of d-axis current, id, and the q-axis current, iq, on the dq coordinates, which is obtained by converting the each phase current iu, iv, and iw actually supplied to the AC motor 11 from the inverter 13 into a value on the dq coordinates, and the d-axis target current, *id, and the q-axis target current, *iq, becomes zero.

That is, as shown in FIG. 2, among the U-phase current, iu; the V-phase current, iv; and the W-phase current, iw, which are supplied to each phase of the AC motor 11 form the inverter 13, the U-phase current, iu, and the W-phase current, iw, for instance, are detected by the electric current detector 16 and 17, respectively, and input into a three-phase ac-dq coordinate transformer 31.

The three-phase ac-dq coordinate transformer 31 transforms the U-phase current, iu, and the W-phase current, iw, on stationary coordinates into rotational coordinates according to the rotational phase of the AC motor 11, i.e., the d-axis current, id, and the q-axis current, iq, on the dq coordinates, based on the following equation (2):

$$\begin{bmatrix} id \\ iq \end{bmatrix} = \sqrt{2} \begin{bmatrix} \sin(\theta re + 2\pi/3) & -\sin\theta re \\ \cos(\theta re + 2\pi/3) & -\cos\theta re \end{bmatrix} \begin{bmatrix} iu \\ iw \end{bmatrix} \quad (2)$$

The d-axis current, id, and the q-axis current, iq, output from the three-phase ac-dq coordinates transformer 31 are input into subtracters 32 and 33, respectively.

The subtracter 32 calculates a deviation, Δidorg, between the d-axis target current, *id, and the d-axis current, id, and the subtracter 33 calculates a deviation, Δiqorg, between the q-axis target current, *iq, and the q-axis current, iq.

In the above case, since the d-axis target current, *id, and the q-axis target current, *iq, and the d-axis current, id, and the q-axis current, iq are direct signals, phase lag and amplitude error, for instance, are detected as a direct current.

Each of the deviation Δidorg and Δiqorg output from the subtracters 32 and 33, respectively, are input into proportional control units 34 and 35, respectively.

The proportional control unit 34 multiplies the deviation, Δidorg, by, for instance, a proportional gain, Kpd, to calculate a d-axis proportional voltage order value, Vdp. The proportional control unit 35 multiplies the deviation, Δiqorg, by, for instance, a proportional gain, Kpq, to calculate a q-axis proportional voltage order value, Vqp.

Also, both the deviation Δidorg and Δiqorg output from each of the subtracters 32 and 33 are input into an integration operation switching unit 37.

The integration operation switching unit 37 calculates a d-axis deviation, Δid, and a q-axis deviation, Δiq, from the deviations, Δidorg and Δiqorg, respectively, based on a predetermined relative relationship of the back electromotive force, Er, of the AC motor 11 and the maximum voltage, Vmax, which may be supplied to the AC motor 11 from the inverter 13 (to be described later.)

The d-axis deviation, Δid, and the q-axis deviation, Δiq, output from the integration operation switching unit 37 are input into integration control units 38 and 39, respectively.

The integration control unit 38 multiplies the d-axis deviation, Δid, by, for instance, a gain, Kid, to calculate a d-axis integration voltage order value, Vdi. The integration control unit 39 multiplies the q-axis deviation, Δiq, by, for instance, a gain, Kiq, to calculate a q-axis integration voltage order value, Vqi.

Also, both the d-axis proportional voltage order value, Vdp, output from the proportional control unit 34 and the d-axis integration voltage order value, Vdi, output from the integration control unit 38 are input into an adder 41. The adder 41 performs an operation in which the d-axis proportional voltage order value, Vdp, and the d-axis integration voltage order value, Vdi, are added to calculate the d-axis voltage order value, *Vd.

In the same manner as above, both the q-axis proportional voltage order value, Vqp, output from the proportional control unit 35, and the d-axis integration voltage order value, Vqi, output from the integration control unit 39, are input into an adder 42. The adder 42 performs an operation in which the q-axis proportional voltage order value, Vqp, and the q-axis integration voltage order value, Vqi, are added to calculate the q-axis voltage order value, *Vq.

The d-axis target current, *id, and the q-axis target current, *iq, and the electrical angular velocity, ωre, of the AC motor 11 output from a polar position-angular velocity detector 15 are input into a non-interference control unit 43. Also, values of the d-axis inductance, Ld, and those of the q-axis inductance, Lq, are maintained in the non-interference control unit 43.

The non-interference control unit 43 calculates a d-axis compensation term, Vdk, and a q-axis compensation term, Vqk, which cancel interference components for the d-axis and the q-axis in order to independently control the d-axis and the q-axis by canceling speed electromotive force components which interfere between the d-axis and the q-axis.

Note that the non-interference control unit 43 stops its operation when, for instance, the back electromotive voltage, Er, of the AC motor 11 is increased and exceeds a predetermined value which depends on the maximum voltage, Vmax, that can be supplied to the AC motor 11 from the inverter 13.

The d-axis compensation terms, Vdk, output from the non-interference control unit 43 and the d-axis voltage order value, *Vd, output from the adder 41 are input into a non-interference control adder 44. The q-axis compensation terms, Vqk, output from the non-interference control unit 43 and the q-axis voltage order value, *Vq, output from the adder 42 are input into a non-interference control adder 45.

The non-interference control adder 44 assigns a new d-axis voltage order value, *Vd, from a value obtained by adding the d-axis compensation term, Vdk, and the (old) d-axis voltage order value, *Vd.

In the same manner as above, the non-interference control adder 45 assigns a new q-axis voltage order value, *Vq, from a value obtained by adding the q-axis compensation term, Vqk, and the (old) q-axis voltage order value, *Vq.

Both the d-axis voltage order value, *Vd, output from the non-interference control adder 44 and the q-axis voltage order value, *Vq, output from the non-interference control adder 45 are input into a dq three-phase ac coordinate transformer 46.

The dq three-phase ac coordinate transformer 46 transforms the d-axis voltage order value, *Vd, and the q-axis voltage order value, *Vq, on the dq coordinates into a U-phase ac voltage order value, *Vu, and a W-phase ac voltage order value, *Vw, on three-phase ac coordinates, which are stationary coordinates, based on the following equation (3):

$$\begin{bmatrix} *Vu \\ *Vw \end{bmatrix} = \sqrt{(2/3)} \begin{bmatrix} \cos\theta re & -\sin\theta re \\ \cos(\theta re + 2\pi/3) & -\sin(\theta re + 2\pi/3) \end{bmatrix} \begin{bmatrix} *Vd \\ *Vq \end{bmatrix} \quad (3)$$

Note that in the equation (3), the coefficient C, which corresponds to the $(2/3)^{1/2}$ in equation (3) is a conversion factor used to keep the dealing voltage from changing before and after the conversion.

The U-phase ac voltage order value, *Vu, and the W-phase ac voltage order value, *Vw, output from the dq-three phase ac coordinate transformer 46 are input into a computing unit 47.

The computing unit 47 calculates a V-phase ac voltage order value, *Vv, using the equation: *Vv=−(*Vu)−(*Vw).

The U-phase ac voltage order value, *Vu, output from the dq three-phase ac coordinate transformer 46 and the V-phase ac voltage order value, *Vv, output from the computing unit 47 are input into the inverter 13 as switching orders.

Next, examples of the operation of the control device 10 for an AC motor according to the embodiment of the present invention having the above-mentioned structure will be explained with an emphasis on the operation of the integration operation switching unit 37 with reference to attached drawings.

Figure 3:
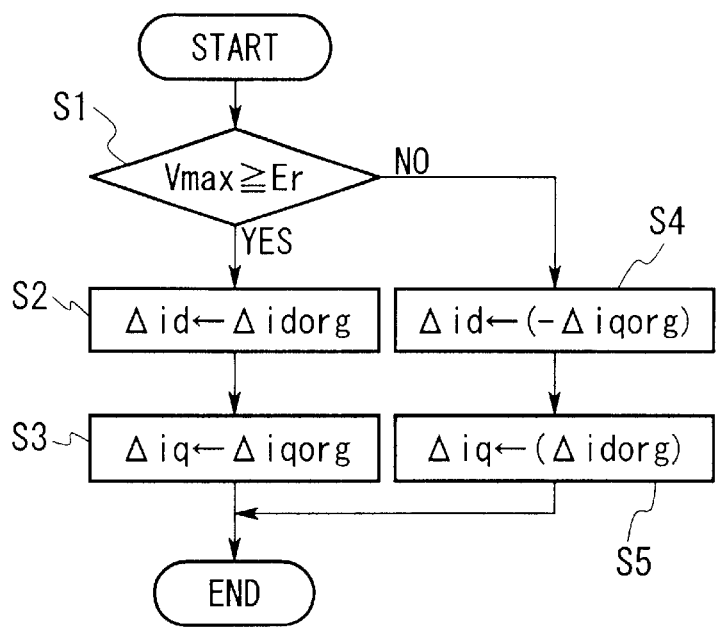
FIG. 3 is a flow chart for explaining the operation of a integration operation switching unit.
Figure 4:
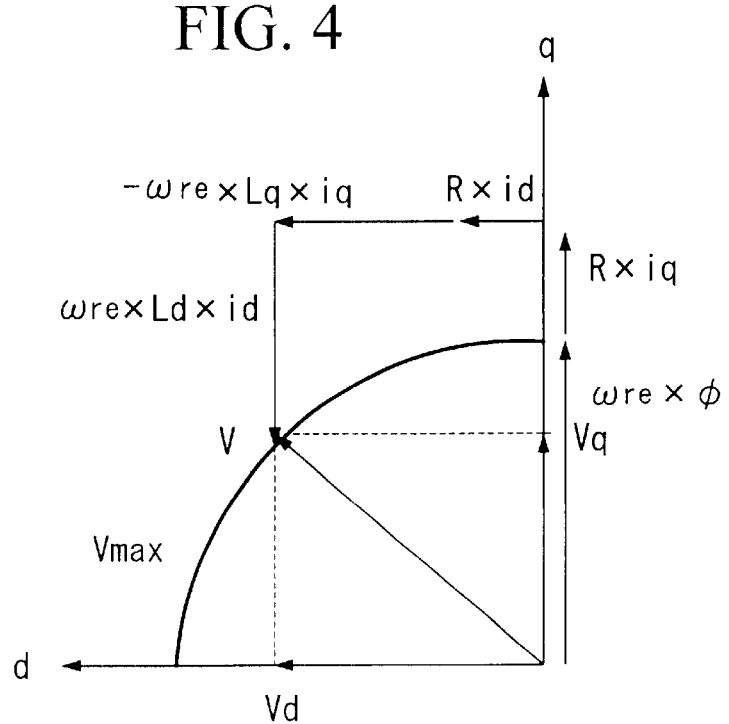
FIG. 4 is a vector diagram showing a stationary state of a conventional control device for an AC motor when a vector control is performed.

FIG. 3 is a flow chart for explaining the operation of the integration operation switching unit 37.

In step S1 of the flow chart, it is determined if the maximum voltage, Vmax, which may be supplied to the AC motor 11 from the inverter 13, is larger than the back electromotive voltage, Er. If the result of the determination is "yes" (i.e., Vmax≧Er), it proceeds to step S2.

In step S2, the deviation, Δidorg, is set for the d-axis deviation, Δid, and proceeds to step S3. In step S3, the deviation, Δiqorg, is set for the q-axis deviation, Δiq, and terminates the series of processes.

On the other hand, if the result of the determination is "no" in step S1, it proceeds to step S4.

In step S4, a negative value of the deviation, Δiqorg, (i.e., −Δiqorg) is set for the d-axis deviation, Δid, and proceeds to step S5. In step S5, the deviation, Δidorg, is set for the q-axis deviation, Δiq, and terminates the series of processes.

The back electromotive voltage, Er, of the AC motor 11 is calculated as Er=φ1×ωre based on the maximum value, φ1, of the field magnetic flux which interlinks with three-phase armature winding (not shown in figures) of the AC motor 11. In this case, the maximum voltage, Vmax, which may be supplied to the AC motor 11 from the inverter 13, is equal to the maximum amplitude of each phase ac voltage and, for instance, it is equal to a half of the power supply voltage, Vdc, (i.e., Vdc/2) if ignoring, for instance, the voltage drop of such elements as the switching elements in the inverter 13.

That is, the equation used for the determination process in step S1 may be expressed as the following equation (4):

$$Vdc/2 \geq \phi 1 \times \omega re \quad (4)$$

Also, in the dq coordinate system, if the conversion factor used for the conversion of the three phase ac coordinates into the dq coordinates, i.e., the coefficient $C=(2/3)^{1/2}$, is considered, the maximum value φ2 of the field flux in the dq coordinates may be expressed as φ2=φ1×(1/C), and the back electromotive voltage, Er, is expressed as the equation: Er=100 2×ωre. Accordingly, the maximum voltage, Vmax, which may be supplied to the AC motor 11 from the inverter 13, is expressed as the equation: Vmax=(Vdc/2)×(1/C). That is, the equation used for the determination process in step S1 may be expressed by the following equation (5):

$$(Vdc/2) \times \sqrt{(+e, fra\ 3/2)} + ee \geq \phi 2 \times \omega re \quad (5)$$

As explained above, according to an embodiment of the control device 10 for an AC motor of the present invention, it becomes possible, by carrying out a weak field control, to control the electric current of the AC motor 11 in a stable manner even when the back electromotive voltage, Er, of the AC motor 11 exceeds the maximum voltage, Vmax, which may be supplied to the AC motor 11 from the inverter 13, and the d-axis voltage tends to be dominated mainly by the q-axis current, iq, and the q-axis voltage is mainly dominated by the d-axis current. Thus, according to the present invention, a desired torque may be assuredly generated.

Also, according to the present invention, when a battery is used as the power supply 14 and if a change such as a power supply voltage, Vdc, drop is caused by, for instance, a deterioration or a reduction in the remaining charge of the battery, the d-axis deviation, Δid, and the q-axis deviation, Δiq, may be adjusted in accordance with the changed power supply voltage, Vdc. Accordingly, the control of the AC motor may be smoothly performed, for example, in synchronization with a start timing of the weak field control.

Although the maximum voltage, Vmax, which may be supplied to the AC motor 11 from the inverter 13, is equal to half of the power supply voltage, Vdc, (i.e., Vdc/2) in the embodiment mentioned above, the maximum voltage is not limited as such and may be a value taking into account the drop in voltage when, for instance, there is a voltage drop of such elements as a switching element in the inverter 13.

Moreover, although it is determined in step S1 of the above embodiment of the present invention that if the maximum voltage, Vmax, which may be supplied to the AC motor 11 from the inverter 13, is larger than the back electromotive voltage, Er, of the AC motor 11, it is not limited as such and it is possible to determine if the maximum voltage, Vmax, which may be supplied to the AC motor 11 from the inverter 13, is larger than the back electromotive voltage, Er, of the AC motor 11 by a predetermined value, α, i.e., (Er+α.)

Further, although the non-interference control is carried out when the back electromotive voltage, Er, of the AC motor 11 is smaller than the maximum voltage, Vmax, which may be supplied to the AC motor 11 from the inverter 13, in the above-mentioned embodiment of the present invention, it is not limited as such and the non-interference control unit 43 need not be employed.

In addition, although an ACS motor of a permanent magnet type is used as the AC motor 11 in the above embodiment of the present invention, it is not limited as such and other alternating current motors such as an induction motor may be used.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. A control device for an alternating current motor, comprising:

a target current generating unit which generates a current order value, based on a torque order, as a d-axis target current and a q-axis target current on dq coordinates which are of a rotating rectangular coordinate system;

a current detection device which detects an alternating current supplied to each phase of a polyphase alternating current motor;

a coordinate transforming unit which transforms said alternating current detected by said current detection device into a d-axis current and a q-axis current on said dq coordinates; and a vector control unit which carries out a current feedback control so that said d-axis current follows up said d-axis target current and said q-axis current follows up said q-axis target current, wherein said vector control unit further comprises:

an operation switching unit which, depending on whether a back electromotive voltage of said alternating current motor is greater than or equal to a predetermined value, calculates one of a d-axis deviation and a q-axis deviation from the deviation between said d-axis target current and said d-axis current and the other one of the d-axis deviation and the q-axis deviation from the deviation between said q-axis target current and said q-axis current; and an integration controlling unit which outputs a d-axis integration voltage order value proportional to an integral value of said d-axis deviation and a q-axis integration voltage order value proportional to an integral value of said q-axis deviation, wherein an alternating current supplied to each phase of said alternating current motor is controlled based on an output of said integration controlling unit.

2. A control device for an alternating current motor according to claim 1, further comprising:

a power conversion unit which drives said alternating current motor, said power conversion unit being controlled by said vector control unit; and a power supply unit which supplies a direct current to said power conversion unit, wherein said predetermined value is equal to the maximum voltage which may be supplied to said alternating current motor from said power conversion unit and adjustable depending on the magnitude of a voltage supplied by said power supply unit.

* * * * *